United States Patent [19]

Grunwald

[11] Patent Number: 4,829,327
[45] Date of Patent: May 9, 1989

[54] OVERHEAD PROJECTOR

[76] Inventor: Peter H. Grunwald, Schlattstr. 215, FL 9491 Ruggel, Liechtenstein

[21] Appl. No.: 92,033

[22] Filed: Sep. 2, 1987

[51] Int. Cl.$^4$ .............................................. G03B 21/00
[52] U.S. Cl. ...................................... 353/122; 353/57; 353/85; 353/101; 353/DIG. 4
[58] Field of Search .................. 353/57, 65, 66, 85, 353/101, 122, DIG. 3, DIG. 4; 315/117

[56] References Cited

U.S. PATENT DOCUMENTS

| | | | |
|---|---|---|---|
| 3,833,297 | 9/1974 | Swartz | 353/85 |
| 4,156,561 | 5/1979 | Lucas | 353/38 |
| 4,565,430 | 1/1986 | Grunwald | 353/66 |
| 4,672,271 | 6/1987 | Gear et al. | 315/117 |

Primary Examiner—L. T. Hix
Assistant Examiner—David M. Gray
Attorney, Agent, or Firm—Robert E. Burns; Emmanuel J. Lobato

[57] ABSTRACT

An overhead projector comprises a housing having an upwardly facing writing plate and a Fresnel lens below the writing plate. A hollow support arm extending up from one side of the housing supports a projection head comprising a lamp directing light down onto the writing plate, a variable objective lens receiving an image from the writing plate and a deflection mirror for directing the image onto a projection screen. A power supply in the support arm supplies power for the projector including the lamp and a blower in the support arm for cooling the power supply and lamp. A microprocessor in the support arm has inputs receiving signals from sensors for sensing the distance from the projector to the screen, ambient brightness, brightness contrast in the projected image on the screen and the temperature of the power supply and the microprocessor. The microprocessor has outputs for regulating the focus of the objective lens, the speed of the blower, the brightness of the lamp and the voltage of the power supply.

3 Claims, 2 Drawing Sheets

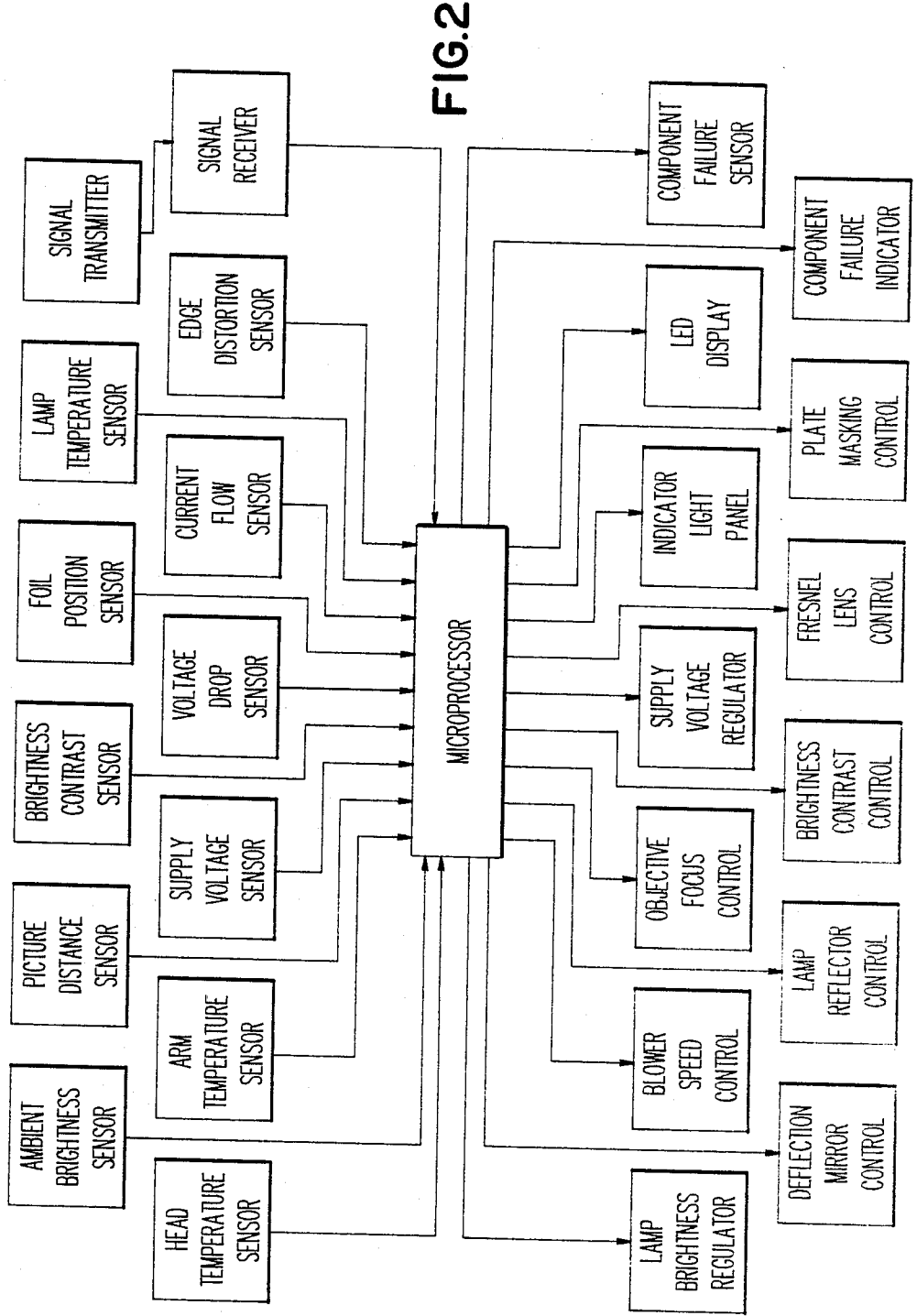

OVERHEAD PROJECTOR

FIELD OF INVENTION

The invention relates to an overhead projector comprising a housing accomodating a writing plate and a Fresnel lens, a support arm which extends up from one side of the housing, a light source and a projection head with an objective lens and a deflection mirror supported by the support arm as well as a light source with a power supply and a blower.

BACKGROUND OF THE INVENTION

Overhead projectors in a variety of styles and types are known. In one type of overhead projector the housing accomodates the light source as well as the writing plate and Fresnel lens. With this type of overhead projector the housing is block-shaped. In another type of overhead projector the light source is in the projection head. The housing then accomodates only the writing plate and Fresnel lens and has a low profile which is almost flat. The power supply of this overhead projector is either in the housing or in the support arm. In many cases the power supply is cooled by an air stream produced by a blower which likewise cools the light source and possibly the objective lens.

These overhead projectors work with a constant brightness. This has the objection that in a room flooded with daylight the brightness is frequently too limited while in a darkened room the brightness is too great. In particular during the changing of projection foils the brightness is frequently found to be too strong. It is possible to control the brightness by hand, for example by means of a simple potentiometer. However in practice such adjustment is not used for the reason that a lecturer operating the overhead projector does not wish to disturb his concentration on the lecture.

The concentration of the lecturer operating an overhead projector is also disturbed when it is necessary from time to time to adjust the picture sharpness. Moreover the ability of a lecturer to concentrate is impared by the monotonous and sleep-producing noise of the blower.

SUMMARY OF THE INVENTION

The invention eliminates these objections of the state of the art. It is an object of the invention so to construct the overhead projector with relatively simple means that the attention of the lecturer is no longer disturbed through technical manipulation and adjustment of the overhead projector, when the lecturer prior to his lecture, has adjusted the deflection mirror on the overhead projector so that the desired picture size of the projected picture on the projection wall is attained.

The invention consists therein that on the housing and/or on the support arm and/or on the projection head there is arranged at least one sensor for the ambient light and/or for the distance of the picture from the objective lens and/or for the light contrast in the picture and/or for determining the position of a projection foil on the writing plate and/or for the temperature in the light source and/or in the projection head and/or for the supply voltage and/or for the voltage drop or current flow in the electrical components and that there is provided a microprocessor which advantageously is accomodated in the housing and/or in the support arm and/or in the projection head and whose inputs are the outputs of the sensors and whose output is connected to a brightness regulator of the light source and/or a sharp focussing motor arranged on the objective lens and/or a speed regulator of the blower and/or a supply voltage regulator or whose output forms the outputs of these regulators.

By a sensor is understood a detector consisting of a measuring receptor, for example of brightness, distance, electrical voltage, electrical current, etc., which at its output delivers an electrical impulse, a pulse sequence, a voltage or a current or alters its inner electrical value (resistance, capacitance or inductance).

With this overhead projector, all adjustment functions are effected automatically through the microprocessor on the basis of the measurements of the sensors without the help of the lecturer. This brings the advantage to the lecturer that he no longer need to bother with the technique of projection during his lecture. The microprocessor sets all parameters to their optimal value and readjusts them. It adjusts the brightness according to the ambient light. It takes care of optimal focusing. It provides a changing blower speed so that the lecturer and the audience are not put to sleep by a monotonous noise. It effects a dimming of the projection brightness during change of projection foils. It serves for voltage stabilization and adjustment and can take over the function of a power supply unit.

It is advantageous when an input of the microprocessor is connected with the output of a signal receiver of a signal transmitter located at a distance from the overhead projector and/or arranged on the overhead projector. It is hereby possible for the lecturer, during the projection, to move away from the overhead projector and nevertheless be able to control it, for example to adjust the brightness when he so desires.

Moreover it is advantageous when at least one output of the microprocessor is connected with one or more indicator lights on the overhead projector. Such indicator lights can signal the projection format and also a defect or anticipated defect. For example they can signal that the normal life of the projection lamp is exceeded or that the current consumption of the projection lamp indicates that this will fail in a certain time, that temperatures, in particular parts of the overhead projector are so great that further brightness increase is not permissible, that the supply voltage for the drive is not suitable etc.

Moreover it can be advantageous when at least one output of the microprocessor is connected to an LCD-Display on which different information can be given, for example the duration of the lecture a reminder of particular themes etc.

It can be advantageous when the microprocessor includes a generator for producing a voltage which varies according to a predetermined law or scheme for driving the blower so as to avoid a monotonous blower noise.

It can be advantageous when the microprocessor includes a switch for dimming the light source during projection foil change so that the eyes of the audience are not disturbed by accessive brightness when projection foils are changed and after the projection foil change become accustomed to the limited brightness of the projected picture.

BRIEF DESCRIPTION OF DRAWINGS

The nature and advantages of the invention will be more fully understood from the following description of a preferred embodiment illustrated by way of example in the accompanying drawings in which.

DESCRIPTION OF PREFERRED EMBODIMENT

Figure 1:
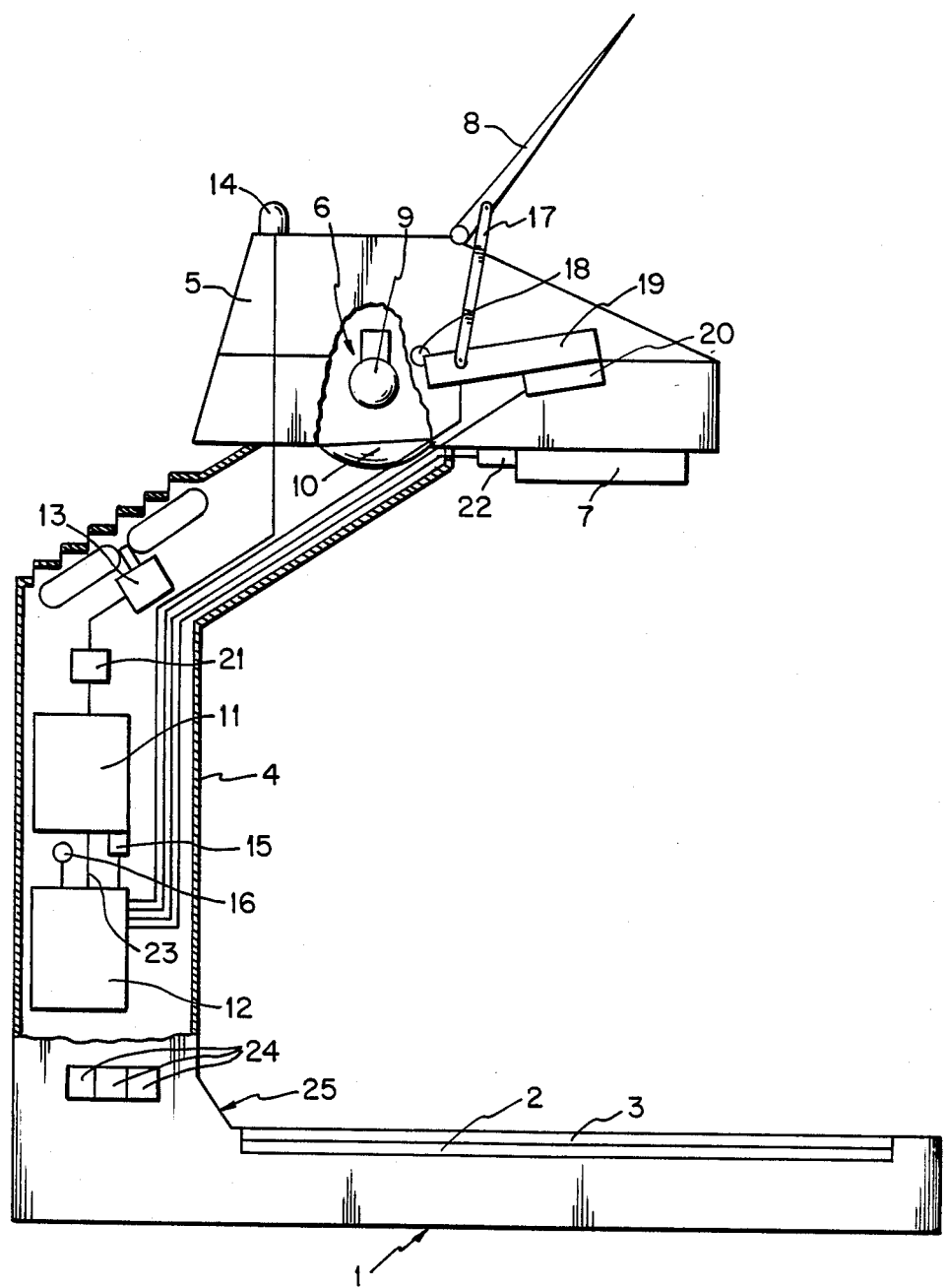
FIG. 1 is a schematic side elevation of an overhead projector in accordance with the invention partially in section and, FIG. 2 is a schematic diagram of electrical circuitry of the overhead projector.

The overhead projector has a housing 1 on which a Fresnel lens 2 and writing plate 3 are accomodated. A support arm 4 extending up from one side of the housing carries a projection head 5 and also a light source 6. The projection head 5 has an objective lens 7 and a deflection mirror 8. The light source 6 comprises a lamp 9 and a condenser lens 10. Inside the hollow support arm 4 a power supply unit 11, a microprocessor 12 and a blower 13 are accomodated. On the support arm 4 a sensor 14 for determining the ambient brightness i.e. for the brightness in the room, is arranged. This is connected with one input of the microprocessor 12. Ahead of the power supply unit 12 there is provided a sensor 15 for determining the value of the supply voltage. In the support arm 4 there is provided a sensor 16 for determining the temperature in the support arm and thereby the temperature of the power supply unit and the microprocessor. A sensor 19 pivoted at 18 and coupled with the deflection mirror 8 by a lever 17 senses the distance between the projector and the surface on which a picture is to be projected. Coupled with the sensor 19 is a sensor 20 for determining picture contrast. Ahead of the blower 13 there is provided a speed regulator 21 which is connected with an output of the microprocessor 12. On the objective lens 7 there is provided a regulator 22 with a motor for adjusting the objective lens. This regulator is connected with another output of the microprocessor. The conductor 23 from the output of the microprocessor leads to the power supply unit 11 and serves to provide brightness adjustment of the lamp 9. On the housing 1 of the overhead projector there are provided indicator lights 24 and an LCD display 25 connected with outputs of the microprocessor 12.

It is especially advantageous when a device for sharp focusing of the objective lens, advantageously an auto focus device, is connected with the microprocessor and when a transmitter for a measuring device for the distance between the objective and the projection wall is connected with an input of the microprocessor. It is hereby attained that a constant sharp focusing of the objective by the microprocessor is attained.

Further, for the production of an outstanding picture, it is advantageous when the objective i.e. lenses of the objective and/or the deflection mirror and/or the Fresnel lens and/or the lamp and/or the reflector for the lamp and/or the condensor for the lamp is arranged adjustably and when in the microprocessor there is provided a control for determining the optimal adjustment of these adjustable components the output of which is connected with an indicating device and/or adjustment motors for these components.

It is particularily advantageous when in the microprocessor there is provided a control with which the objective and/or deflection mirror and/or Fresnel lens and/or writing plate are so adjusted that the projected picture has the least possible edge distortion and when a device for measuring edge distortion of the picture is connection with an input of the microprocessor.

The microprocessor can hereby take over the duty of automatic adjustment when adjustment motors are provided. However it can also, through indication of the deviation from optimum value the attainment of optimum values, guide service personnel in making adjustment of the components by hand.

For the supervision and the automatic or manual adjustment of the overhead projector it is advantageous when, on the output of the microprocessor, there is provided an indicator panel with several indicator devices for indicating the life duration of components such as the lamp, motors and the like and/or indicating problems such as lamp failure, excessive temperature in the components such as the power supply motors objective and the like as well as indicating excessive temperature in the projection receiver and when at the input of the microprocessor corresponding sensors are connected.

Of particular significance is the observance of optimal temperature in the overhead projector. For this it is advantageous when a temperature sensor for control of the speed of the blower is connected with the input of the microprocessor. In this manner the blower is operated at minimum required speed whereby the overhead projector has in operation the least possible generation of noise.

If different picture formats are to be projected, it is advantageous when there is provided a device for masking the working surface and/or for adjustment for the zoom objective under control of the microprocessor. This device for masking the working surface can for example, comprise LCD's which are controlled to be either light or dark and indeed to be light in that area which is to be projected and dark in the area which is not to be projected. Through the adjustment of the zoom objective corresponding to the projection surface, there is achieved the greatest possible area of a picture corresponding to the size of the projection wall on which the picture is to be projected.

What I claim is:

1. In an overhead projector comprising a housing accommodating an upwardly-facing writing plate and a Fresnel lens underlying the writing plate,
   a support arm extending up from a side of said housing and supporting a projection head comprising a light source directing light down onto said writing plate and Fresnel lens, objective lens means receiving an image from said writing plate and a deflection mirror for directing said image onto a projection screen, power supply means for said overhead projector including said light source, and
   blower means for producing air flow to cool said power supply means and said light source,
   the improvement comprising a controlling and regulating system comprising microprocessor means having a plurality of inputs and a plurality of outputs,
   means for sensing operation variables of said overhead projector connected with inputs of said microprocessor means, said sensing means including means for sensing the distance from said overhead projector to said projection screen, means for sensing ambient brightness, means for sensing the brightness contrast in the projected image and means for sensing the temperature of said power supply means and microprocessor, and
   a plurality of regulating and control means, connected with outputs of said microprocessor means, said regulating and control means including means for regulating the focussing of said objective lens means, means controlling the speed of said blower means and means controlling the brightness of said light source, said microprocessor means receiving information from said sensing means and controlling said regulating and control means on the basis of information received from said sensing means.

2. An overhead projector according to claim 1, in which said sensing means further include means for sensing the voltage of power supplied to said power supply means.

3. An overhead projector according to claim 1 further comprising visual indicating means connected with an output of said microprocessor means for indicating excessive temperature and failure of components.

* * * * *